United States Patent
Prehofer

(10) Patent No.: US 7,072,301 B2
(45) Date of Patent: Jul. 4, 2006

(54) METHOD FOR SWITCHING CONNECTIONS BETWEEN AT LEAST TWO SUBREGIONS OF A PACKET-ORIENTED NETWORK

(75) Inventor: Christian Prehofer, München (DE)

(73) Assignee: Siemens Aktiengesellschaft, Munich (DE)

( * ) Notice: Subject to any disclaimer, the term of this patent is extended or adjusted under 35 U.S.C. 154(b) by 817 days.

(21) Appl. No.: 09/848,688

(22) Filed: May 3, 2001

(65) Prior Publication Data

US 2004/0202106 A1 Oct. 14, 2004

(30) Foreign Application Priority Data

May 3, 2000 (DE) ................................. 100 21 499

(51) Int. Cl.
*H04J 3/14* (2006.01)
*H04L 12/28* (2006.01)
*H04L 12/56* (2006.01)
*G06F 13/00* (2006.01)

(52) U.S. Cl. ............ 370/236; 370/395.21; 370/395.52; 370/401; 379/88.17; 709/226; 709/229

(58) Field of Classification Search ................ 370/229, 370/230, 231, 235, 236, 252, 253, 352, 359, 370/395.1, 395.2, 395.21, 395.4, 395.5, 395.52, 370/400, 401; 379/88.17, 93.01, 93.06, 93.07; 709/223, 226, 227, 229, 249

See application file for complete search history.

(56) References Cited

U.S. PATENT DOCUMENTS 6,466,985 B1 * 10/2002 Goyal et al. ................. 709/238
6,483,912 B1 * 11/2002 Kalmanek et al. ........... 379/219

(Continued)

FOREIGN PATENT DOCUMENTS

EP 0 736 238 B1 3/1999

(Continued)

OTHER PUBLICATIONS

Buckley: "End to End Quality of Service QoS Control and Signalling in H.323 Systems", ITU-Telecommunication Standardization Sector, Temporaty Document 126 Rev 1, Study Group 16, Editor of Annex N to H.323, XP-002240488, Geneva, Austria, Feb. 7-18, 2000, pp. 1-51.

(Continued)

*Primary Examiner*—Alpus H. Hsu
(74) *Attorney, Agent, or Firm*—Laurence A. Greenberg; Werner H. Stemer; Ralph E. Locher

(57) ABSTRACT

A method is described in which each subregion of a packet-oriented network has an associated item of subregion information, and, when a connection is initialized, the item of subregion information associated with an originating subregion and the destination subregion and also a requested resource are signaled. A connection that is to be initialized from one subregion to another subregion is authorized taking into account the requested resources and the available transmission system resources between the subregions.

17 Claims, 1 Drawing Sheet

U.S. PATENT DOCUMENTS

| | | | | |
|---|---|---|---|---|
| 6,529,499 B1 * | 3/2003 | Doshi et al. | ................ | 370/352 |
| 6,590,865 B1 * | 7/2003 | Ibaraki et al. | .............. | 370/230 |
| 6,600,735 B1 * | 7/2003 | Iwama et al. | ................ | 370/352 |
| 6,609,316 B1 * | 8/2003 | Ohba et al. | ............ | 370/395.42 |
| 6,636,508 B1 * | 10/2003 | Li et al. | ..................... | 370/389 |
| 6,674,760 B1 * | 1/2004 | Walrand et al. | ............. | 370/411 |
| 6,708,209 B1 * | 3/2004 | Ebata et al. | ................ | 709/223 |
| 6,745,246 B1 * | 6/2004 | Erimli et al. | ............... | 709/238 |

FOREIGN PATENT DOCUMENTS

| | | |
|---|---|---|
| EP | 1 047 226 A2 | 10/2000 |
| GB | 2 331 659 A | 5/1999 |
| WO | 99/53719 | 10/1999 |

OTHER PUBLICATIONS

Yavatkar, et al.; "A Framework for Policy-based Admission Control", RFC 2753, Network Working Group, XP-002179102, Jan. 2000, pp. 1-20.

International Telecommunication Union: "Packet-based multimedia communication systems", Series H: Audiovisual and Multimedia Systems, Infrastructure of audiovisual services-Systems and terminal equipment for audiovisual services, ITU-T Recommendation H.323, XP-002166480, Sep. 1999, pp. 1-120.

* cited by examiner

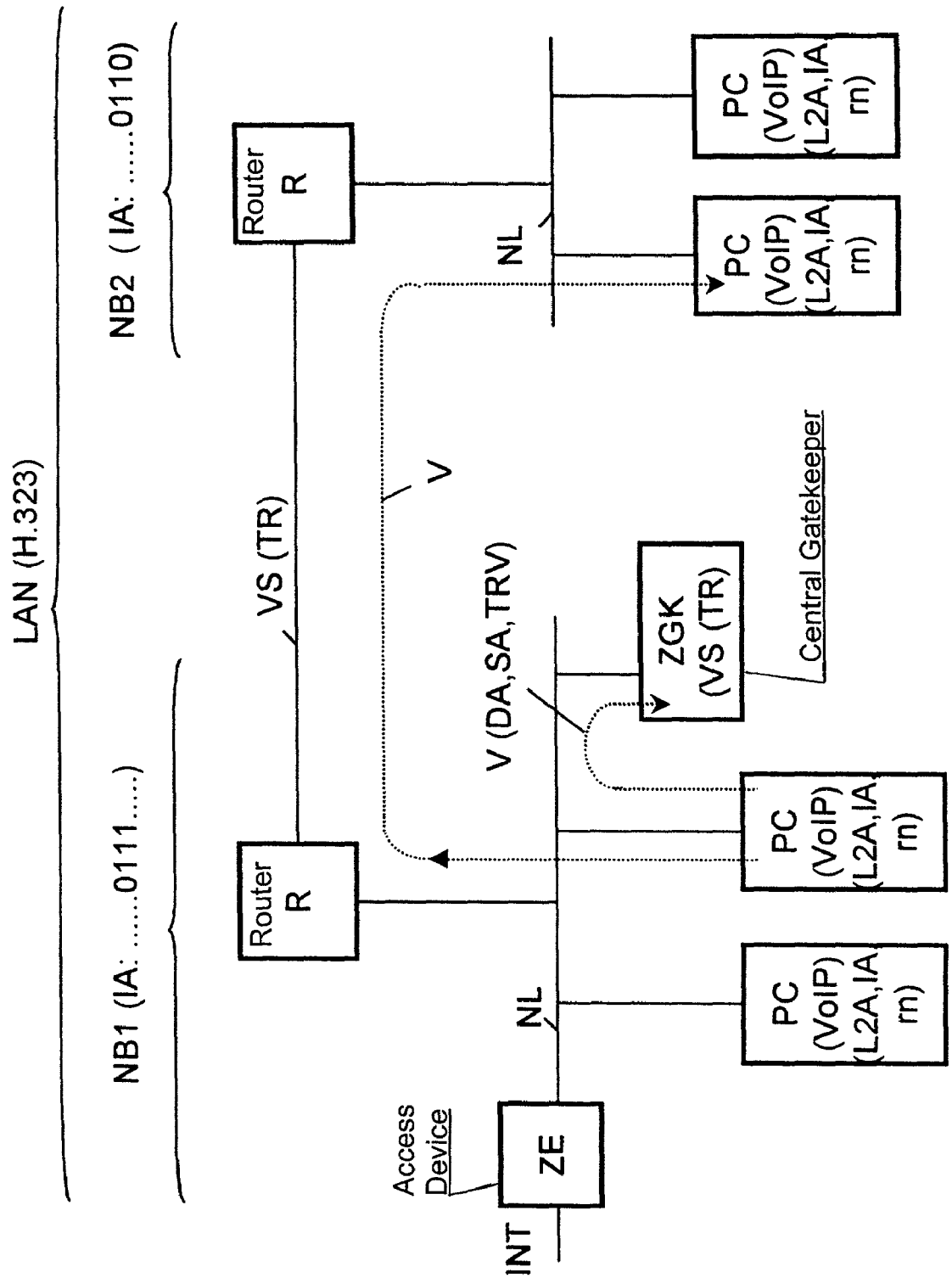

METHOD FOR SWITCHING CONNECTIONS BETWEEN AT LEAST TWO SUBREGIONS OF A PACKET-ORIENTED NETWORK

BACKGROUND OF THE INVENTION

Field of the Invention

In connectionless, packet-oriented networks, such as on the Internet or in networks based on ITU-T Standard H.323, no quality of service is guaranteed for connections between terminals in the networks. The quality of service also includes the bandwidth and the transmission speed that is provided for a connection.

In the case of voice transmission in local area networks, that is to say in packet-oriented networks, the quality of service is assured by over dimensioning the transmission system resources, since high bandwidths can be achieved inexpensively in local area networks. Frequently, subregions of local area networks—for example company-internal communication networks—are connected to one another to form one local area network. Since the subregions of the local area networks are usually provided at geographically different locations, leased lines are usually provided for the connections between the subregions. To assure a sufficient quality of service for connection paths routed between the subregions, there must only be as many connections routed via the connection path between the networks as there are available transmission system resources, a transmission system resource being demanded for each connection during connection initialization. In most applications, central units are provided which coordinate and monitor the connections within a subregion. By way of example, a packet-oriented multimedia communication system based on ITU-T Standard H.323 contains gatekeepers or bandwidth managers which control and monitor data links and voice links—and in the case of access to the Internet, also Voice over Internet links. In this context, it is a complex matter to monitor the bandwidth for each individual connection over the data paths for all initialized connections beyond the respective subregions as well. To do this, it is necessary to know the exact switching paths for the connections within the subregions or within the local area network. However, the very high level of complexity results in that such implementation is not economical in the gatekeepers of the multimedia communication systems based on Standard H.323.

Another alternative for assuring the quality of service in connections routed between subregions of a local area network is to over dimension the connection paths between the subregions of the local area network. Such a solution requires a high level of additional technical and hence also financial input.

SUMMARY OF THE INVENTION

It is accordingly an object of the invention to provide a method for switching connections between at least two subregions of a packet-oriented network which overcomes the above-mentioned disadvantages of the prior art methods of this general type, in which it is assured that the quality of service for connections routed between subregions of a packet-oriented network via connection paths having prescribed transmission system resources is provided.

With the foregoing and other objects in view there is provided, in accordance with the invention, a method for assuring quality connections between at least two subregions of a packet-oriented network, at least one connection path between the subregions has a prescribed scope of transmission system resources. The method includes the steps of providing each of the subregions with an associated item of subregion information; signaling the associated item of subregion information associated with an originating subregion and a destination subregion and also signaling requested resources, if a connection is initialized; and authorizing the connection to be initialized from the originating subregion to the destination subregion taking into account the requested resources and the transmission system resources available between the subregions.

The fundamental aspect of the method according to the invention is that each subregion has an associated item of subregion information, and, when a connection is initialized, the item of subregion information associated with the origin subregion and the destination subregion and also a resource request are signaled. A connection which is to be initialized from one subregion to another subregion is authorized taking into account the requested resources and the available scope of transmission system resources between the subregions. Preferably, the item of subregion information is represented by an item of user group information, the latter being indicated by an additional item of address information or dialing information, or by an association between groups of address information items for the network and the subregions, or by an association between groups of Layer 2 information items and the subnetworks, or by an association between parts of an item of address information or dialing information and the subregions, or items of organizational information for the subregions.

One fundamental advantage of the method according to the invention can be seen in that the connections which are to be passed between the subnetworks are recognized centrally in the subregions on account of the item of address information which identifies a subregion, and the knowledge about the prescribed transmission system resources between the origin subregion and the destination subregion can be used as a basis for controlling or authorizing the connections via the connection path having the prescribed transmission system resource. Therefore, no more connections having a requested transmission system resource or a transmission speed can be connected via the at least one connection path between the subregions than transmission resources that are available for the connections. This significantly increases the quality of service, and the additional or associated item of address information or organization information, which each define a user group or a subregion, and the requested transmission system resources allow the available transmission system resources between the subregions to be checked and a statement to be made regarding the authorization of an initialized connection.

In accordance with one variant embodiment of the method according to the invention, the subregions of the network can be subdivided into further subranges, the further subranges each having been allocated some of the transmission system resources of the at least one transmission path. The subranges are advantageously represented by user groups having different services or service classes. Therefore, for different services, the quality of service or the prescribed transmission system resources can be determined differently for each service.

In accordance with another advantageous embodiment of the method according to the invention, the quality of service of the connections in at least one of the packet-oriented subnetworks is assured for at least one other subnetwork. Therefore, not every gatekeeper—in the case of H.323 networks—or a unit controlling the connections in the respective subregion need have a controller in line with the method according to the invention. This further reduces the level of financial input.

In the case of a network based on ITU-T Standard H.323, the subregions are advantageously formed by local zones, with a gatekeeper being provided at least in one of the subregions for switching connections and voice links. In accordance with another advantageous variant, the subregions are formed by Internet sections, with part of the Internet address determining an Internet section. In this case, the method according to the invention can be implemented with particular advantage in at least one of the Internet sections, which may be based on a packet-oriented network in accordance with Standard H.323.

The prescribed transmission system resources are advantageously determined by an item of bandwidth information or by a number of connections having prescribed items of bandwidth information. The bandwidth information defines, in particular, average or peak transmission rates or transmission speeds.

When there are a plurality of connection paths between the subregions, the transmission system resources are prescribed for each connection path and together form the prescribed transmission system resources. In this context, each of the connection paths or each of the transmission system resources can be monitored on the basis of the method according to the invention.

In accordance with another variant of the method according to the invention, the items of subregion information can be allocated different switching priorities. This variant is used advantageously when connections for individual services need to be given preferential treatment over connections for other services.

Other features which are considered as characteristic for the invention are set forth in the appended claims.

Although the invention is illustrated and described herein as embodied in a method for switching connections between at least two subregions of a packet-oriented network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single figure of the drawing is a block diagram of a packet oriented network according to the invention.

DESCRIPTION OF THE PREFERRED EMBODIMENTS

Referring now to the single figure of the drawing, there is shown a packet-oriented network, in particular a packet-oriented local area network LAN, which is formed by two subregions NB1, NB2. The two subregions NB1, NB2 are connected by a connection path VS, with the connection path VS being connected to a router R in the respective subregions NB1, NB2. The router R is a linking element between transmission networks NL of the subregions NB1, NB2 of the local area network LAN. The router R checks origin addresses and destination addresses SA, DA, and, if there is a destination address which is not associated with the particular subregion NB1, NB2, the packet is switched to the other subregion NB1, NB2. In the illustrative embodiment, it may be assumed that the local area network LAN in the form of a bus is involved, with the bus-like transmission links of the subregions NB1, NB2 being connected via the routers R and the connection path VS.

In addition, terminals in the form of personal computers PC are connected to the transmission links NL of the subregions NB1, NB2. For the illustrative embodiment, it may also be assumed that the local area network LAN or the subregions NB1, 2 are configured in accordance with ITU-T Standard H.323, and, for connection control and monitoring, the first subregion NB1 contains a central gatekeeper ZGK which performs these functions for both subregions NB1, NB2.

The first subregion NB1 is, by way of example, the central communication network of a company central control station, and the second subregion NB2 is a branch office of the company. It may also be assumed for the illustrative embodiment that both subregions NB1, NB2 of the local area network LAN are connected to the Internet INT by an access device ZE connected in the first subregion NB1. Therefore, not only the Internet links but also Voice over Internet links are initialized and routed among the personal computers PC or to the Internet INT. If the local area network LAN is part of the Internet INT, then the access device ZE is dispensed with.

Each of the terminals or personal computers PC and the central gatekeeper ZGK have both a physical Layer 2 address L2A and an Internet address IA associated with them. For transmitting voice information within the local area network LAN and also to or from the Internet INT, a respective Voice over Internet function VoIP is provided in the terminals or personal computers PC. In this context, normal telephone numbers rn can be used as addresses for initializing or setting up connections V.

According to the invention, each of the subregions NB1, NB2 is now allocated an item of subregion information. Such an item of subregion information may be represented by part of the Internet address IA or part of the Layer 2 address L2A or else part of the telephone numbers rn. Thus, by way of example, the first subregion of the Internet address IA, or a subregion of the Internet address that is disposed between two points of the Internet address IA, can be used for determining an item of subregion information or user group information. In the illustrative embodiment, in the central region of the Internet address IA, the item of user group information 0111 is associated with the first subregion NB1, and the item of user group information 0110 is associated with the second subregion NB2. Alternatively, this association can be made using the Layer 2 addresses L2A or parts of the Layer 2 addresses or the telephone numbers rn, with a prefix, i.e. a preceding additional telephone number or item of address information, also being possible in the case of the telephone numbers rn.

Within the context of the connection V initialized by the personal computer PC, the connection V is signaled or indicated to the central gatekeeper ZGK. In this case, a destination address and an origin address DA, SA have been entered in the header of the packet indicating the initialization. Since the central gatekeeper ZGK is responsible both for the first and the second subregion NB1, NB2, the connection(s) V initialized both by the first and the second subregion NB1, NB2 are signaled to the central gatekeeper ZGK. The central gatekeeper ZGK stores the information that a connection path VS having a prescribed transmission system resource TR exists between the first and the second subregion NB1, NB2. By way of example, the transmission system resources can be provided by a transmission link having a transmission speed of 128 kbit/sec. Within the context of the connection V being signaled to the central gatekeeper ZGK, the latter checks whether the personal computer PC determined by the destination address DA or the access device ZE in the first or in the second subregion NB1, NB2 is connected to the local area network LAN. If the personal computer PC or the access device ZE intended to be used for communication is disposed in the respective other subregion NB1, NB2, that is to say the connection V is routed via the two routers R and the connection path VS, a check is also carried out to determine how many of the transmission system resources TR are available in the transmission link VS. On the basis of the transmission system resources TRV requested with the signaling of the connection V, the central gatekeeper ZGK can check whether the available transmission system resources TR are still sufficient for the signaled connection V. If the transmission system resources TR are available, an appropriate message is sent to the personal computer PC signaling the connection or to the access device ZE. If the transmission system resources TR are not available, an announcement indicating lack of availability is transmitted to the personal computer PC signaling the connection or to the access device ZE, as a result of which the communication with the personal computer PC determined by the item of destination information DA is terminated.

After initialization and authorization, the requested transmission system resources TRV for the connection V are added to the currently available transmission system resources TR and represent the available transmission system resources TR for other connections V. If the connection V is terminated, its requested transmission system resources TRV are released again, i.e. are subtracted from the currently available transmission system resources TR.

To give preference to particular services, for example to the Voice over Internet service VOIP, a priority can be allocated to a group of personal computers PC within a subregion NB of the local area network LAN. The allocation of priorities can be achieved by subdividing the subregions NB1, NB2 into further subregions and giving the subdivided subregions preferential treatment, that is to say handling them with priority during connection control in the central gatekeeper ZGK and in the routers R.

If a plurality of connection paths VS are provided between the subregions NB, then the prescribed or maximum available transmission system resources TR can be stored in the central gatekeeper ZGK for each of the connection paths VS. In this context, with another subgroup of the subregions NB1, NB2, for example, each subgroup can be allocated the connection path VS or some of the transmission system resources TR of the connection paths VS. Alternatively, the transmission system resources TR of all the connection paths VS may be regarded as a single transmission system resource for connections from one subregion NB1 to the other subregion NB2.

The method according to the invention is not limited to this illustrative embodiment, but rather can be used in all packet-oriented networks having a plurality of subregions with a different geographical configuration, it being possible for the subregions to be connected to one another by different connection paths—for example optical connection paths or radio links or infrared links. In addition, the method according to the invention can be implemented in subregion controllers in each of the subregions or else in one central controller for the entire packet-oriented network. In this context, there is merely a need for adjustments in line with the transmission protocols and initialization procedures used in the subregions and in the packet-oriented network.

I claim:

1. A method for assuring a quality of service of connections between at least two subregions of a packet-oriented network, at least one connection path between the subregions has a prescribed scope of transmission system resources, which comprises the steps of:
   providing each of the subregions with an associated item of subregion information being represented by an item of address information or dialing information;
   signaling the associated item of subregion information associated with an originating subregion and a destination subregion and also signaling requested resources, if a connection is initialized; and
   authorizing the connection to be initialized from the originating subregion to the destination subregion taking into account the requested resources and the transmission system resources available between the subregions and disregarding the transmission system resources available within each of the subregions.

2. The method according to claim 1, wherein the quality of service of the connections in at least one of the subregions is assured for at least one other of the subregions.

3. The method according to claim 1, which comprises representing the associated item of subregion information by an item of user group information, the item of user group information having the item of address information or the dialing information.

4. The method according to claim 1, which comprises subdividing the subregions of the packet-oriented network into further subranges, the further subranges are each allocated some of the transmission system resources of the at least one connection path.

5. The method according to claim 4, which comprises representing the further subranges by user groups having different services.

6. The method according to claim 4, which comprises forming the packet-oriented network based on ITU-T Standard H.323, and the subregions are formed by local zones, with a gatekeeper being provided at least in one of the subregions for switching the connections and voice links.

7. The method according to claim 6, which comprises allocating one of groups of telephone numbers and parts of the telephone numbers to the subregions for the voice links through one of the subregions and for Voice over Internet links.

8. The method according to claim 4, which comprises representing the further subranges by user groups having different service classes.

9. The method according to claim 1, which comprises forming the subregions as Internet sections with part of an Internet address determining an Internet section.

10. The method according to claim 1, which comprises determining the transmission system resources by one of an item of bandwidth information and a number of connections having a prescribed item of bandwidth information.

11. The method according to claim 1, which comprises, if there is a plurality of connection paths between the subregions, prescribing individual transmission resources for each of the connection paths and a summation of the individual transmission resources together forming the transmission system resources.

12. The method according to claim 1, which comprises allocating each of the associated item of subregion information different transmission priorities.

13. The method according to claim 1, which comprises, representing the associated item of subregion information by an item of user group information, the item of user group information having an association between groups of address information items for the packet-oriented network and the subregions.

14. The method according to claim 1, which comprises representing the associated item of subregion information by an item of user group information, the item of user group information having an association between groups of Layer 2 information items and the subregions.

15. The method according to claim 1, which comprises representing the associated item of subregion information by an item of user group information, the item of user group information having an association between parts of an item of address information and the subregions.

16. The method according to claim 1, which comprises representing the associated item of subregion information by an item of user group information, the item of user group information having an item of organizational information for the subregions.

17. The method according to claim 1, which comprises representing the associated item of subregion information by an item of user group information, the item of user group information having an association between parts of a dialing information and the subregions.

* * * * *